US006969046B2

(12) United States Patent
Streutker et al.

(10) Patent No.: US 6,969,046 B2
(45) Date of Patent: Nov. 29, 2005

(54) VENTING MECHANISM

(75) Inventors: Alen David Streutker, Florence, KY (US); Travis Edward Langevin, Olathe, KS (US); Robert James Good, Raytown, MO (US); Ka-Nam Ho, Shatin (HK); Steve Lynn Sweeton, Summit, MO (US); Phillip Joseph DiMaggio, Kansas City, MO (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/281,634

(22) Filed: Oct. 28, 2002

(65) Prior Publication Data

US 2003/0052194 A1 Mar. 20, 2003

Related U.S. Application Data

(62) Division of application No. 09/624,061, filed on Jul. 24, 2000, now Pat. No. 6,502,766.

(51) Int. Cl.[7] .............................................. F16K 31/44
(52) U.S. Cl. ...................... 251/214; 251/321; 251/324
(58) Field of Search ......................... 251/214, 318–324

(56) References Cited

U.S. PATENT DOCUMENTS

| | | | | |
|---|---|---|---|---|
| 2,117,747 | A | 5/1938 | Smith et al. | |
| D125,635 | S | 3/1941 | Karstadt | |
| 3,137,326 | A | 6/1964 | Welty et al. | |
| 3,173,584 | A | 3/1965 | Giavasis | |
| 3,462,082 | A | 8/1969 | Everett | |
| 3,490,656 | A | 1/1970 | Taschner | |
| 3,563,273 | A * | 2/1971 | Mills | 137/625.69 |
| 3,565,344 | A | 2/1971 | Takei et al. | |
| 3,667,655 | A | 6/1972 | Knieriem, Jr. | |
| 3,768,734 | A | 10/1973 | Anderson, Jr. et al. | |
| 3,901,449 | A | 8/1975 | Bochmann | |
| 3,904,116 | A | 9/1975 | Jones et al. | |
| 3,993,250 | A | 11/1976 | Shure | |
| D244,991 | S | 7/1977 | Weekman et al. | |
| 4,060,182 | A | 11/1977 | Kikuchi | |
| 4,072,252 | A | 2/1978 | Steyns et al. | |
| 4,153,203 | A | 5/1979 | Tada | |
| 4,154,375 | A | 5/1979 | Bippus | |
| 4,160,525 | A | 7/1979 | Wagner | |
| 4,162,037 | A | 7/1979 | Koyama | |
| 4,187,959 | A | 2/1980 | Pelton | |
| 4,189,098 | A | 2/1980 | Wagner et al. | |
| 4,220,285 | A | 9/1980 | Gualdi | |
| 4,222,525 | A | 9/1980 | Hildebrandt | |
| D258,880 | S | 4/1981 | Blomberg | |
| 4,361,256 | A | 11/1982 | Corsette | |
| 4,434,917 | A | 3/1984 | Saito et al. | |
| 4,454,965 | A | 6/1984 | Kirk, Jr. | |

(Continued)

*Primary Examiner*—Gene Mancene
*Assistant Examiner*—Patrick Buechner
(74) *Attorney, Agent, or Firm*—Thibault Fayette; Kim W. Zerby; Steven W. Miller

(57) ABSTRACT

A liquid sprayer is provided. This liquid sprayer comprises a bottle having an opening and a sprayer housing attached to the bottle. This sprayer housing includes an electric motor, a voltage source for powering the electric motor, a pump driven by the motor, a switch for completing an electrical circuit, a nozzle mechanism attached to the sprayer housing for spraying a liquid. The liquid sprayer also comprises a venting mechanism. This venting mechanism comprises a vent housing having an inner surface and an outer surface, and a translating piston disposed in the vent housing.

6 Claims, 8 Drawing Sheets

U.S. PATENT DOCUMENTS

| | | | | |
|---|---|---|---|---|
| 4,519,518 | A | | 5/1985 | Wiles et al. |
| 4,527,741 | A | | 7/1985 | Garneau |
| 4,618,077 | A | | 10/1986 | Corsette |
| 4,618,099 | A | | 10/1986 | Nagao et al. |
| 4,621,770 | A | | 11/1986 | Sayen |
| 4,767,033 | A | | 8/1988 | Gemperle |
| 4,790,454 | A | | 12/1988 | Clark et al. |
| 4,819,835 | A | | 4/1989 | Tasaki |
| 4,830,235 | A | | 5/1989 | Miller |
| 4,911,361 | A | | 3/1990 | Tada |
| 4,925,105 | A | | 5/1990 | Lin |
| 4,940,186 | A | | 7/1990 | Tada |
| 4,953,791 | A | | 9/1990 | Tada |
| 4,958,754 | A | | 9/1990 | Dennis |
| 5,014,884 | A | | 5/1991 | Wunsch |
| 5,064,168 | A | * | 11/1991 | Raines et al. ............... 251/322 |
| 5,147,074 | A | | 9/1992 | Battegazzore |
| 5,150,841 | A | | 9/1992 | Silvenis et al. |
| 5,195,664 | A | | 3/1993 | Rhea |
| 5,215,227 | A | | 6/1993 | Farner |
| 5,238,152 | A | | 8/1993 | Maas et al. |
| 5,244,126 | A | | 9/1993 | Geier |
| 5,257,724 | A | | 11/1993 | Steijns |
| D343,577 | S | | 1/1994 | Proctor |
| 5,297,701 | A | | 3/1994 | Steijns et al. |
| 5,310,089 | A | | 5/1994 | Hudgins |
| 5,322,418 | A | * | 6/1994 | Comer ........................ 417/53 |
| D351,646 | S | | 10/1994 | Foster et al. |
| 5,395,051 | A | | 3/1995 | Anderson et al. |
| 5,397,034 | A | | 3/1995 | Wunsch |
| 5,467,900 | A | | 11/1995 | Maas et al. |
| 5,472,119 | A | | 12/1995 | Park et al. |
| 5,509,608 | A | | 4/1996 | Foster et al. |
| 5,586,688 | A | | 12/1996 | Johnson et al. |
| 5,645,221 | A | | 7/1997 | Foster |
| 5,647,539 | A | | 7/1997 | Dobbs et al. |
| 5,704,521 | A | | 1/1998 | Grogan et al. |
| 5,706,984 | A | | 1/1998 | Tada et al. |
| 5,711,461 | A | | 1/1998 | Foster et al. |
| 5,715,974 | A | | 2/1998 | Foster et al. |
| 5,716,007 | A | | 2/1998 | Nottingham et al. |
| 5,716,008 | A | | 2/1998 | Nottingham et al. |
| RE35,744 | E | | 3/1998 | Foster et al. |
| 5,725,132 | A | | 3/1998 | Foster et al. |
| 5,752,629 | A | | 5/1998 | Hardy |
| 5,755,686 | A | * | 5/1998 | O'Neill et al. .............. 604/508 |
| 5,806,724 | A | | 9/1998 | Foster |
| 5,810,209 | A | | 9/1998 | Foster |
| 5,845,798 | A | | 12/1998 | Carrier |
| 5,845,820 | A | | 12/1998 | Foster |
| D405,008 | S | | 2/1999 | Irwin et al. |
| D406,052 | S | | 2/1999 | Dunmont et al. |
| D406,060 | S | | 2/1999 | Dunmont et al. |
| 5,884,845 | A | | 3/1999 | Nelson |
| 5,928,594 | A | | 7/1999 | Foster |
| 5,938,081 | A | | 8/1999 | Foster et al. |
| 5,938,082 | A | | 8/1999 | Foster et al. |
| D418,404 | S | | 1/2000 | Irwin et al. |
| D420,914 | S | | 2/2000 | Cummings |
| D421,388 | S | | 3/2000 | Cummings |
| 6,032,814 | A | | 3/2000 | Foster |
| 6,752,330 | B2 | | 6/2004 | DiMaggio et al. |
| 2003/0042330 | A1 | | 3/2003 | Streuker et al. |

* cited by examiner

VENTING MECHANISM

CROSS-REFERENCE TO RELATED APPLICATIONS

This application is a divisional patent application of U.S. patent application Ser. No. 09/624,061, to Streutker et al., filed Jul. 24, 2000, now U.S. Pat. No. 6,502,766.

TECHNICAL FIELD OF THE INVENTION

This invention relates to the field of liquid sprayers, and, more particularly, to the field of liquid sprayers having an electrical motor driving a pump.

BACKGROUND OF THE INVENTION

Sprayers have been generally used to spray liquids in order to atomize in fine droplets a liquid. The atomization of a liquid enables a better coverage of a surface by the liquid. Usually, sprayers comprise a container which is used to store the liquid and which is connected to a sprayer head. The sprayer head usually includes a trigger which activates a pump that drives the liquid to the nozzle which in turns atomizes the liquid. Those sprayers are manually activated and require the user to push the trigger several times so long as she wishes to spray the liquid. In addition to require the user to push the trigger several times, those manually activated sprayers can only maintain a uniform pattern of spray for a relatively short period of time. One of the improvements made to the sprayers was to incorporate an electrical motor connected to a switch and a portable voltage source to them. Those electrical sprayers only require the user to push the trigger once and maintain the trigger pushed as long as the user wants to spray liquid. The use of those sprayers is usually limited by the autonomy of their voltage source and as a result, one of the problems faced by an inventor is to provide an efficient mechanism which uses energy in the voltage source as to increase the service life of such a device without having to either recharge or change the voltage source prematurely. It can easily be contemplated that the use of electrical components such as a switch, a motor and a voltage source makes those electrical sprayers sensitive to liquid which might be responsible of malfunction of the device in the event the liquid comes in contact with those components. As a result, another problem faced with those sprayers is to provide a device which can limit the risk that the liquid to be sprayed might enter in contact with the electric components.

For the foregoing reasons, there is a need for an electrical sprayer with a higher efficiency and that limits the risk of malfunction due to contacts between a liquid to be sprayed and electrical components.

SUMMARY OF THE INVENTION

A liquid sprayer is provided. The liquid sprayer includes a bottle having an opening, a sprayer housing attached to the bottle. This sprayer housing includes an electric motor, a voltage source for powering the electric motor, a pump driven by the motor, a switch for completing an electrical circuit, a nozzle mechanism attached to the sprayer housing for spraying a liquid, a vent housing having an inner surface and an outer surface, and a translating piston disposed in the vent housing. The sprayer housing also includes a trigger movably connected to the sprayer housing for closing the switch and translating the piston, a first vent tube extending from the opening of the bottle to a first opening of the vent housing a second vent tube extending from the second opening of the vent housing to the first opening of the nozzle mechanism, a pump supply tube extending from the opening of said bottle to an inlet of the pump and a pump discharge tube extending from the outlet of the pump to the second opening of the nozzle mechanism.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE PREFERRED EMBODIMENTS

Figure 1:
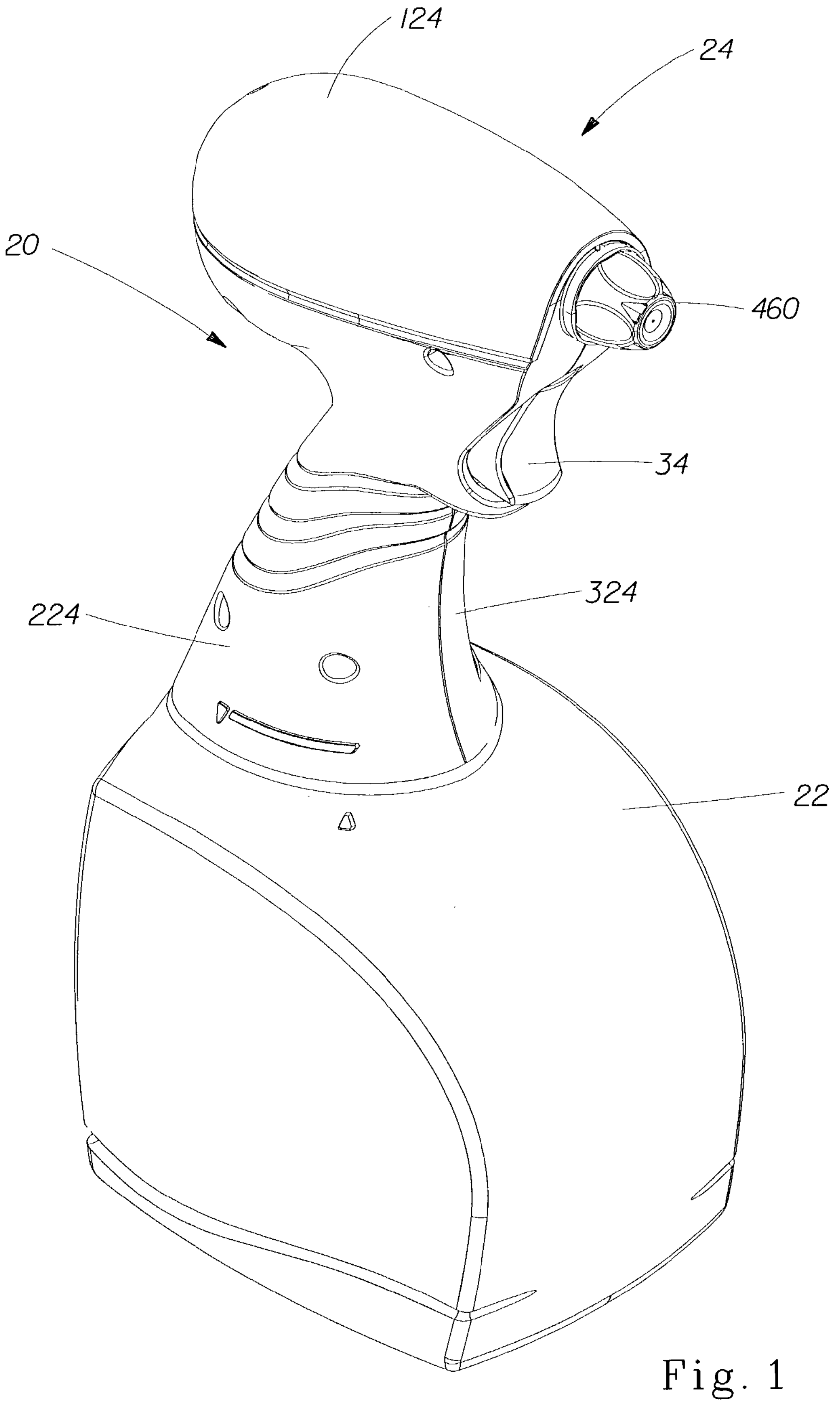
FIG. 1 is a perspective view of the liquid sprayer showing the sprayer head connected to the bottle.

Reference will now be made in detail to the present preferred embodiments of the invention, examples of which are illustrated in the accompanying drawings wherein like numerals indicate the same elements throughout the views and wherein reference numerals having the same last two digits (e.g., 20 and 120) connote similar elements. Referring to FIG. 1, a preferred liquid sprayer 20 comprising a bottle 22 and a sprayer head 24 is illustrated which is suitable for spraying a variety of liquid compositions. While the liquid sprayer 20 is particularly suited for use with household compositions, it is contemplated that other liquid compositions can be used with the liquid sprayer 20. The bottle 22 preferably has a capacity of about 1 liter, although other bottle sizes can be used.

Figure 2:
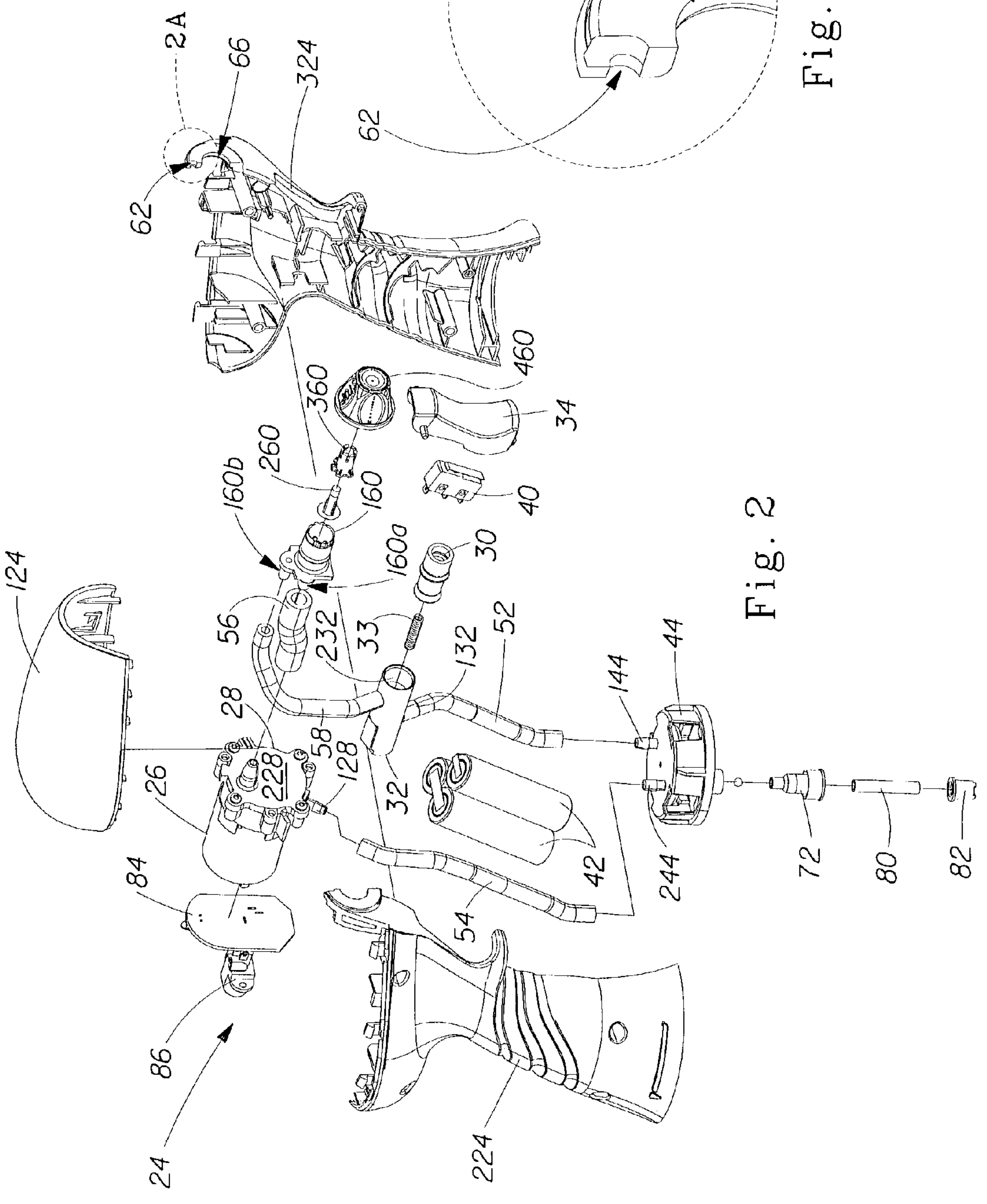
FIG. 2 is an exploded view of a preferred liquid sprayer made in accordance with the present invention but omitting the bottle for clarity.
Figure 2A:
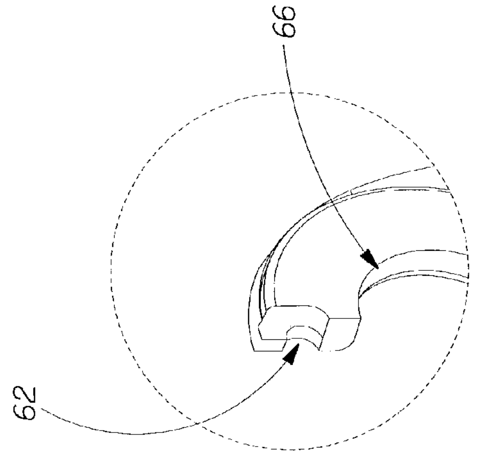
FIG. 2A is a fragmentary enlargement of FIG. 2 showing the semi-circular openings on the lower housing.
Figure 8:
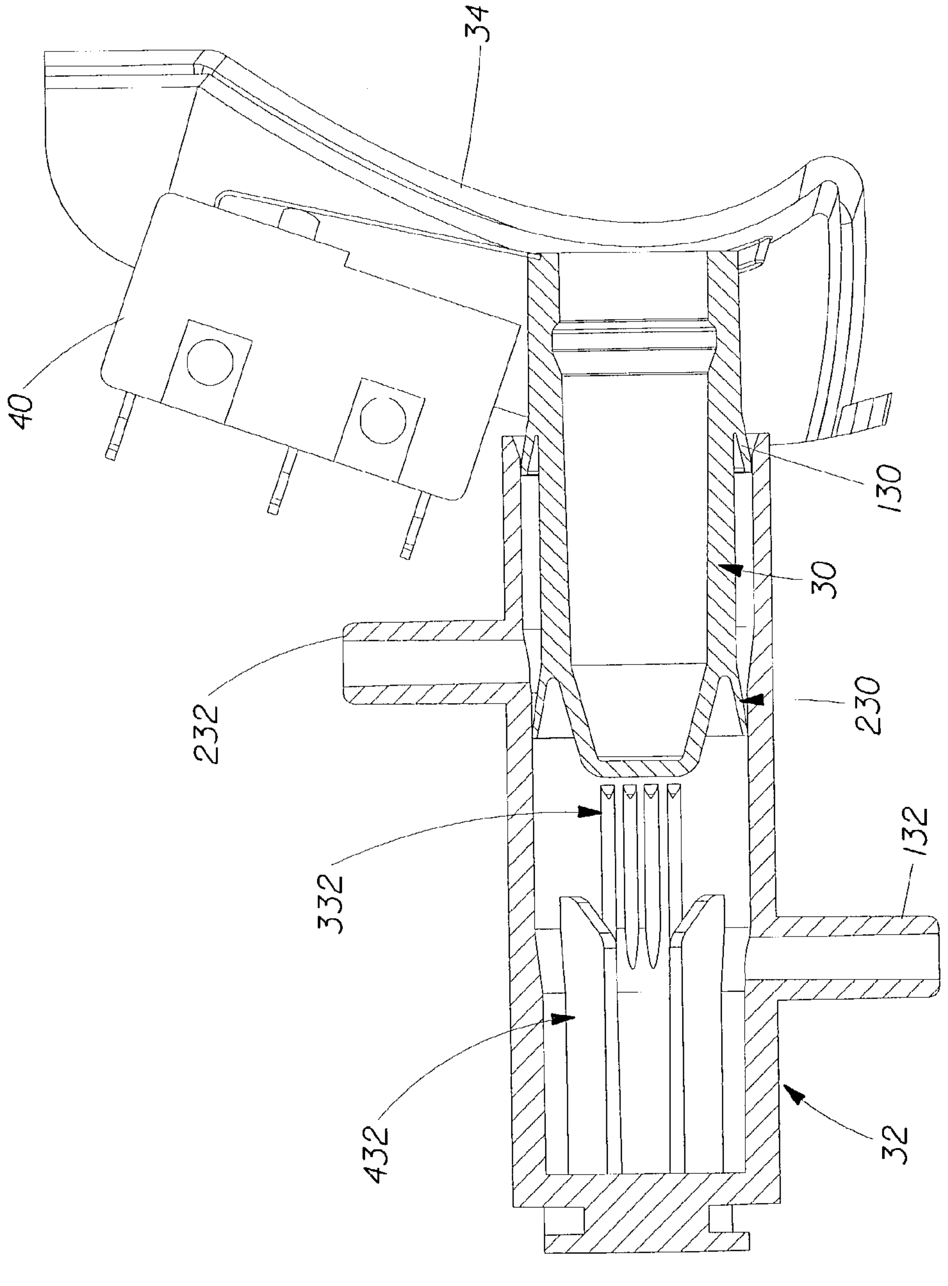
FIG. 8 is a cross-sectional side view of the venting mechanism in the first position with the trigger, the switch and where the compression spring has been removed for clarity.
Figure 9:
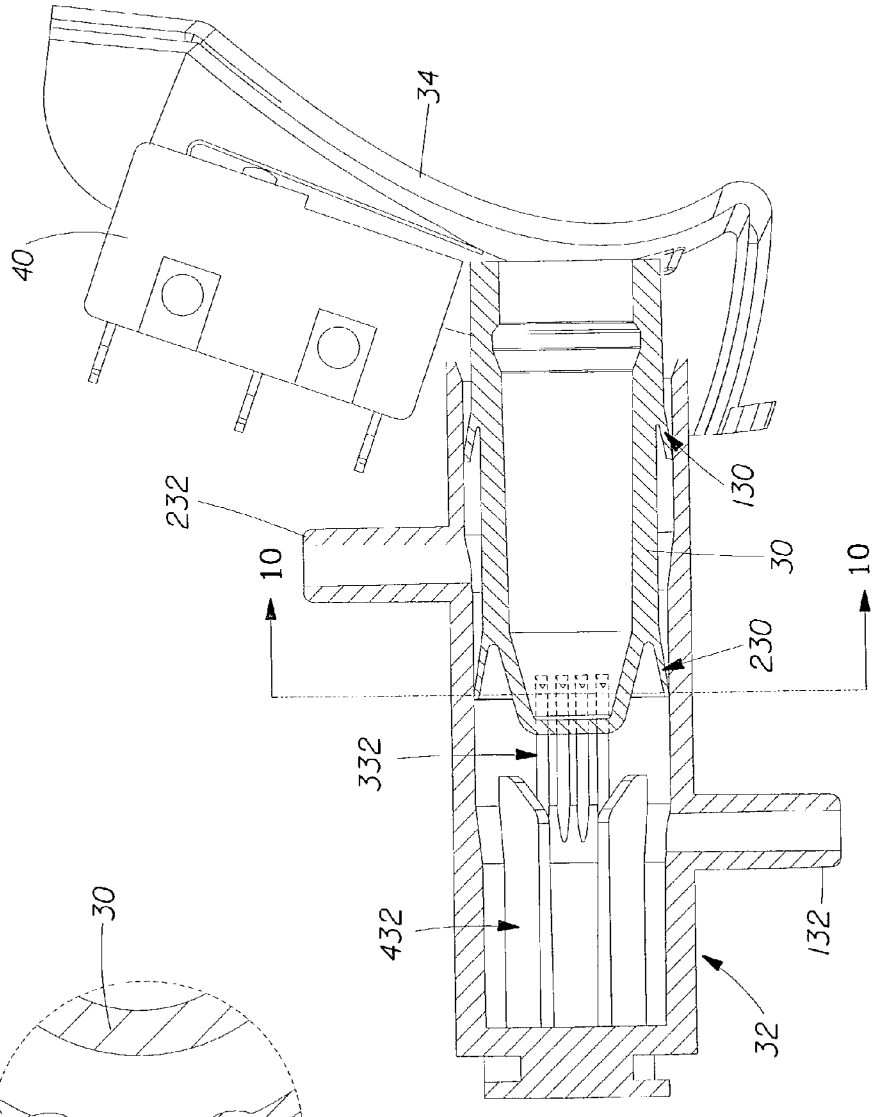
FIG. 9 is a cross-sectional side view of the venting mechanism in the second position with the trigger, the switch is closed and where the compression spring has been removed for clarity.
Figure 11:
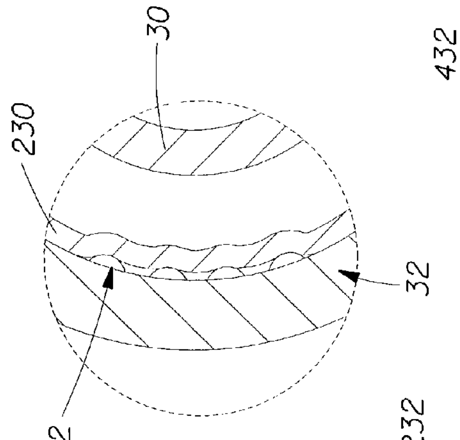
FIG. 11 is a fragmentary enlargement of FIG. 10 showing the deformation of the chevron member
Figure 10:
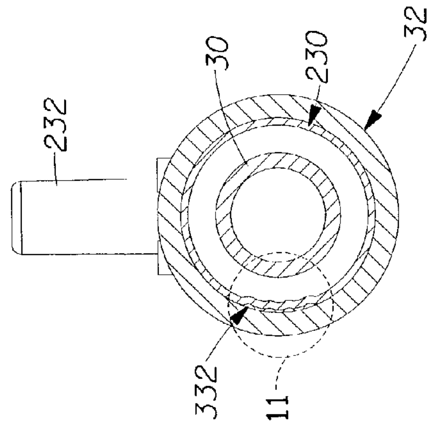
FIG. 10 is a cross-sectional view along line 10—10 of FIG. 9 of the vent housing with the translating piston.

Referring to FIG. 2, the sprayer head 24 comprises the upper shell 124 and two lower housings 224 and 324 connectable with snap or screw connections. Instead of having a sprayer head out of three elements 124, 224 and 324, other housing structures are possible without departing from the scope of protection. The sprayer head 24 houses the spray mechanics, including an electrical motor 26 which is directly coupled to a gear pump 28 and a venting mechanism including a vent piston 30 slidably disposed within a vent housing 32 and a spring 33 biasing the vent piston in the direction of a trigger 34. As shown in FIGS. 8 and 9, a first position of the vent piston 30 in the vent housing 32 prevents venting to occur and a second position of the vent piston 30 in the vent housing 32 enables venting in the bottle. The venting mechanism will later be described in greater details. The trigger 34 is movably attached to left and right housings 224 and 324 when the liquid sprayer is assembled. The trigger 34 translates the vent piston 30 within the vent housing 32 and closes a switch 40. Preferably, the vent piston and switch are arranged so that the vent piston 30 begins to translate before the trigger 34 closes the switch 40. Most preferably, the vent piston 30 and switch 40 are arranged so that the vent piston is in the second position, and therefore enables venting, before the trigger 34 closes the switch 40. When closed by the trigger, the switch 40 completes an electrical circuit between a portable voltage source, illustrated as a plurality of batteries 42, and the electrical motor 26 and therefore activates the gear pump 28. While the pump 28 is preferably provided in the form of a gear pump, other pumps and structures for pressurizing a liquid and delivering the liquid to the nozzle mechanism 60 can be used. For example, vane, piston, lobe, or diaphragm pumps would be acceptable for use. The gear pump 28 is maintained in position by being engaged in two slots located in each of the housings 224 and 324.

Figure 13:
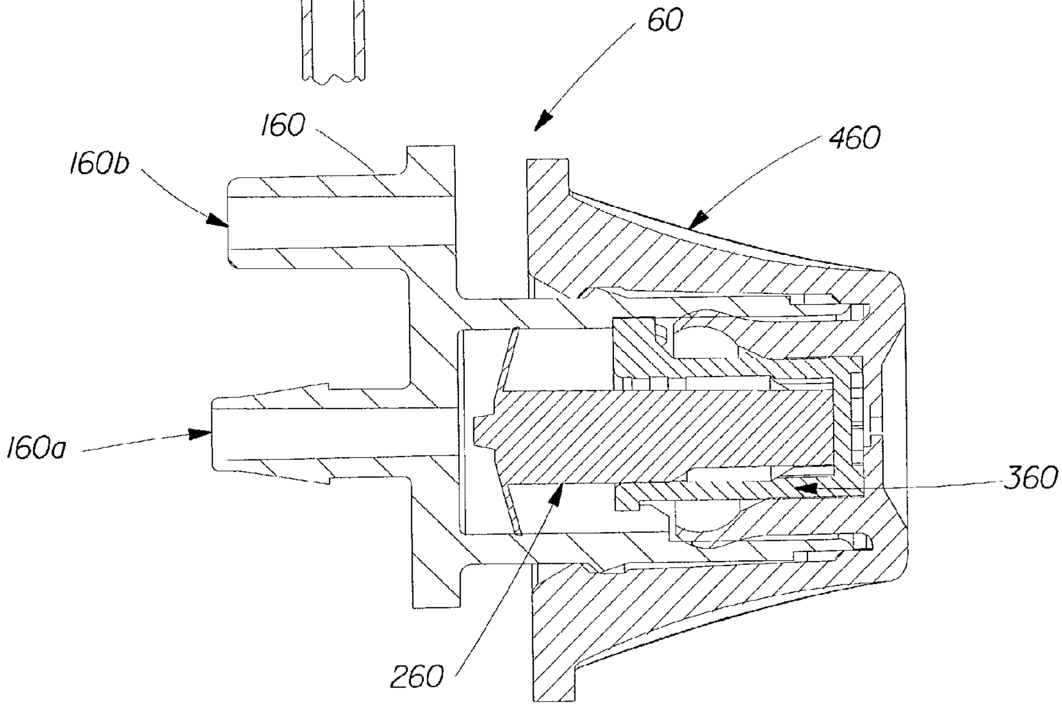
FIG. 13 is a cross-sectional side view of the nozzle mechanism with the nozzle adapter, the discharge valve, the spin mechanics and the nozzle of the liquid sprayer of FIG. 2.

In one embodiment of the invention, the first vent tube 52 is connected to the first opening 132 of the vent housing 32 and extends towards the opening of the bottle 22 while a pump supply tube 54 is connected to the inlet 128 of the gear pump 28 and also extends towards the opening of the bottle 22. A pump discharge tube 56 interconnects the pump outlet 228 with a nozzle adapter 160 through a first passage 160*a*. A second vent tube 58 interconnects the second opening 232 of the vent housing 32 with an opening of the sprayer housing wherein the vent aperture is exposed to the ambient environment. In another embodiment of the invention, the second vent tube 58 interconnects the second opening 232 of the vent housing 32 with a vent aperture 160*b* disposed on the nozzle adapter 160, wherein the vent aperture is exposed to the ambient environment through semicircular cut-outs 62 in each of the housings 224 and 324. The vent aperture 160*b* is located upwardly and axially away from the switch 40 so that in the event the sprayer is in a substantially downward position and a liquid has been able to enter in the venting tubes, this liquid will drop away from the switch 40 and thus substantially limit the risk of contact between the liquid and the switch. As a result, the location of the vent aperture 160*b* disposed on the nozzle adapter 160 limits the risk of malfunction of the sprayer. The nozzle adapter 160 has a hollow post which passes through larger semicircular cut-outs 66 in each of the housings 224 and 324. Disposed within the hollow post is a discharge valve 260 and the spin mechanics 360. A nozzle 460 is mounted on the nozzle adapter as shown in FIG. 13.

Figure 3:
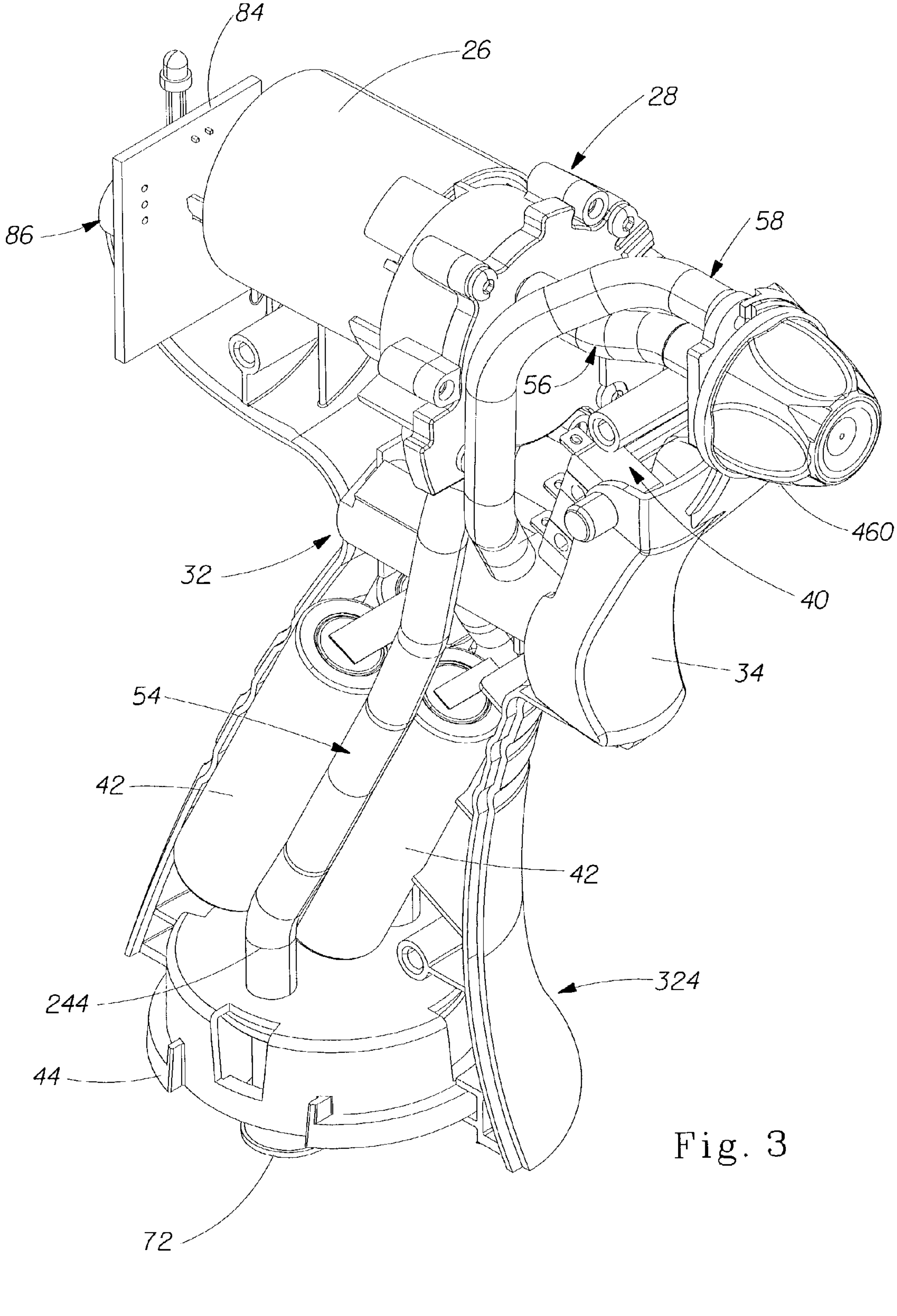
FIG. 3 is a perspective view of the sprayer head assembled without the upper shell and one of the lower housing.
Figure 5:
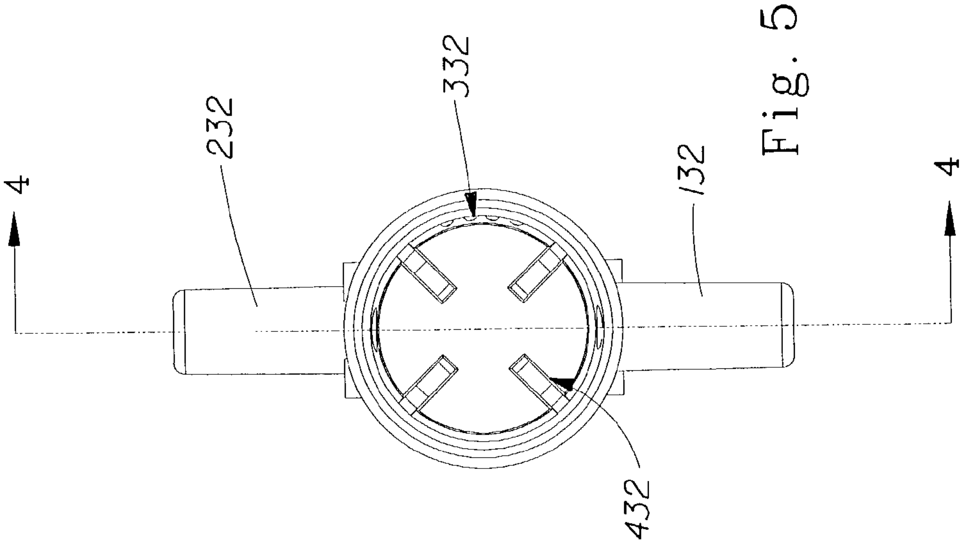
FIG. 5 is a side view of the vent housing of FIG. 2.
Figure 12:
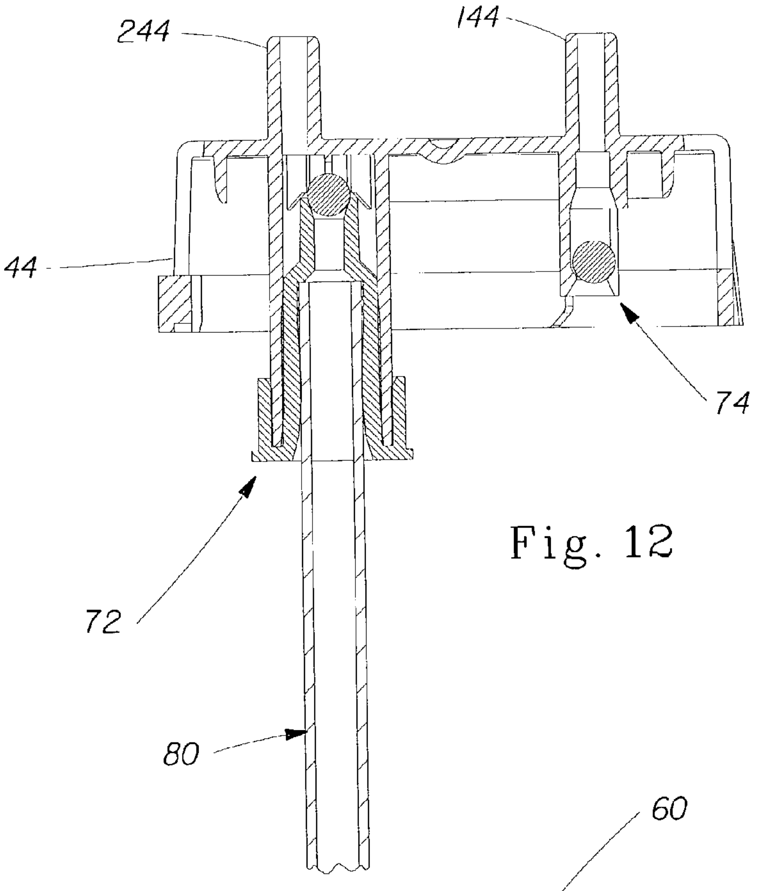
FIG. 12 is a cross-sectional view of the fitment, the check valves and the dip tube.

In one embodiment of the invention, a fitment 44, as shown in FIG. 3 and FIG. 12, is disposed adjacent the bottom of the lower housings 224, 324 and comprises a bayonet-type fitment for engaging a complementary fitment on the finish of the bottle 22. The fitment 44 is maintained in position by being engaged in two slots located in each of the housings 224 and 324. The fitment 44 includes first and second through passages 144 and 244. The first vent tube 52 interconnects the first through passage 144 with a first opening 132 of the vent housing 32 while a pump supply tube 54 interconnects the second through passage 244 with the inlet 128 of the gear pump 28. A first check valve 70 is connected to the first through passage 144 and prevents a liquid from significantly exiting the bottle when the bottle is in a substantially downward position. A second check valve 72 is connected to the second through passage 244 and prevents a liquid from significantly reentering into the bottle 22 when the pump 28 is not functioning. A dip tube 80 extends from the bottle 22 and the second check valve to supply the sprayer with liquid. A dip tube filter 82 can be added at the lower end of the dip tube 80 to prevent particles which may obstruct the nozzle to reach it. In order to effectively spray a liquid, the gear pump 28 will initially need to be primed. By preventing a liquid to significantly reenter into the bottle when the user releases the trigger 34 the second check valve 72 eliminates the necessity to reprime the gear pump after each use of the sprayer and thus improves the efficiency of the liquid sprayer by saving energy in the voltage source. As a result, the check valve 72 contributes to save energy in the portable voltage source. The cracking pressure of the check valve 72 should be sufficient so that a liquid entering the pump supply tube 54 has enough energy to be driven through the gear pump 28, through the nozzle mechanism 60 and break the fluid up into fine droplets. The first and the second check valve, 70 and 72, may be ball valves or other type of check valves commonly known in the art, such as a membrane valves. In another embodiment of the invention, the fitment 44 includes at its lower end a leak tight seal to prevent leakage of the liquid from the bottle.

The electric motor 26 is preferably a direct current electric motor. The electric motor 26 has two electrical connections to which are preferably connected with electrical wires the portable voltage source, illustrated as a plurality of batteries 42 in series, with the switch 40. When the trigger 34 is activated, the translating piston 30 comes to the second position so that venting occurs substantially before the switch 40 is closed. When the switch 40 is closed, an electrical current flows through the electric motor 26 which rotates the gears of the pump 28 to generate a pressure sufficient to open the check valve 72 so that a liquid can flow through the nozzle 60. The occurrence of the venting substantially before the switch 40 is closed contributes to improve the efficiency of the liquid sprayer by equalizing the pressure inside the bottle with the pressure of the ambient environment before the pump is activated. An exemplary motor is a 3 volt to 6 volt series 200 or 300 motor manufactured by Mabuchi Industry Company, Ltd. Of China. Preferably, the motor is a 4.5 volt model RS360SH manufactured by Mabuchy Industry Company, Ltd. An exemplary spray nozzle is manufactured by Calmar, INC. and more fully described in U.S. Pat. No. 4,706,888 to Dobbs et Al, issued Nov. 17, 1987, the substance of which is fully incorporated herein by reference. The sprayer housings 124, 224, 324, nozzle mechanism 60, gear pump 28, fitment 44, vent housing 32 and venting piston 30 can be injection molded using thermoplastic materials as is known in the art. Preferably, the trigger, the spin mechanics, the fitment, the vent housing are formed from polypropylene and the pump housing, the pump cap and the pump gears are formed from acetal polymer. Preferably, he sprayer housings 124, 224, 324 are formed from a mixture of acrylonytrile-butadiene-styrene and polycarbonate. Preferably, the vent piston, the nozzle and the nozzle adapter are formed from polyethylene. The voltage source 42 is preferably three AA, 1.5 volt Panasonic Alkaline batteries which are connected in series.

Figure 4:
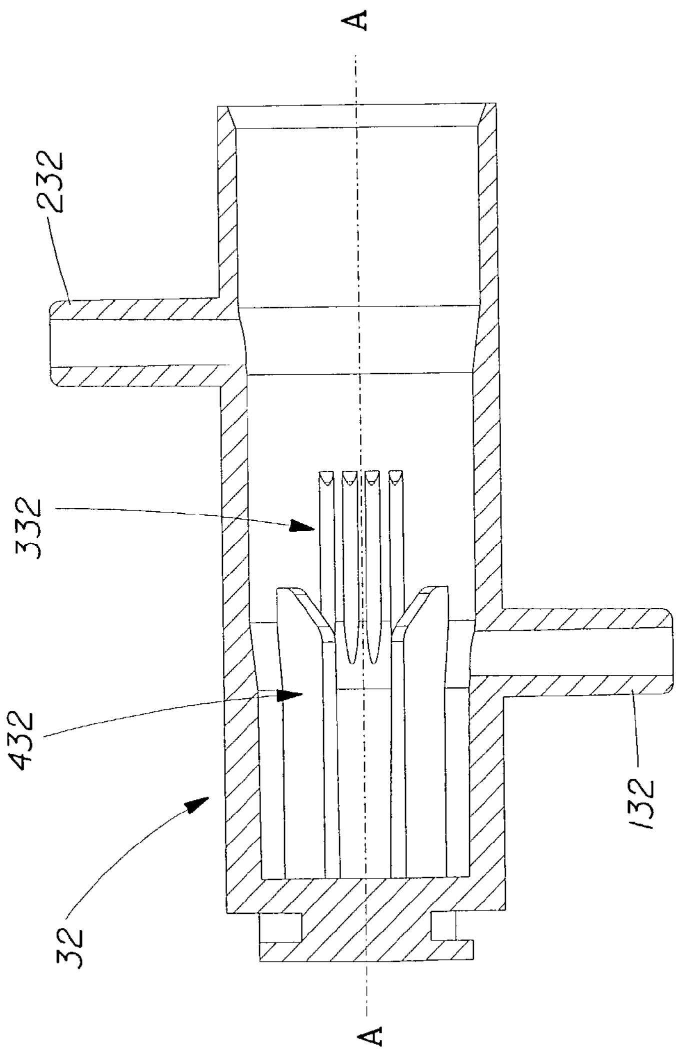
FIG. 4 is a cross-sectional side view along line 4—4 of FIG. 5 of the vent housing of the liquid sprayer of FIG. 2.
Figure 7:
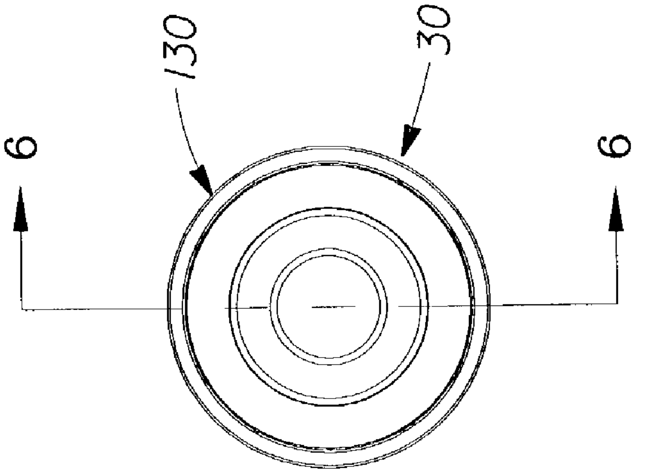
FIG. 7 is a side view of the vent piston of the liquid sprayer of FIG. 2.
Figure 6:
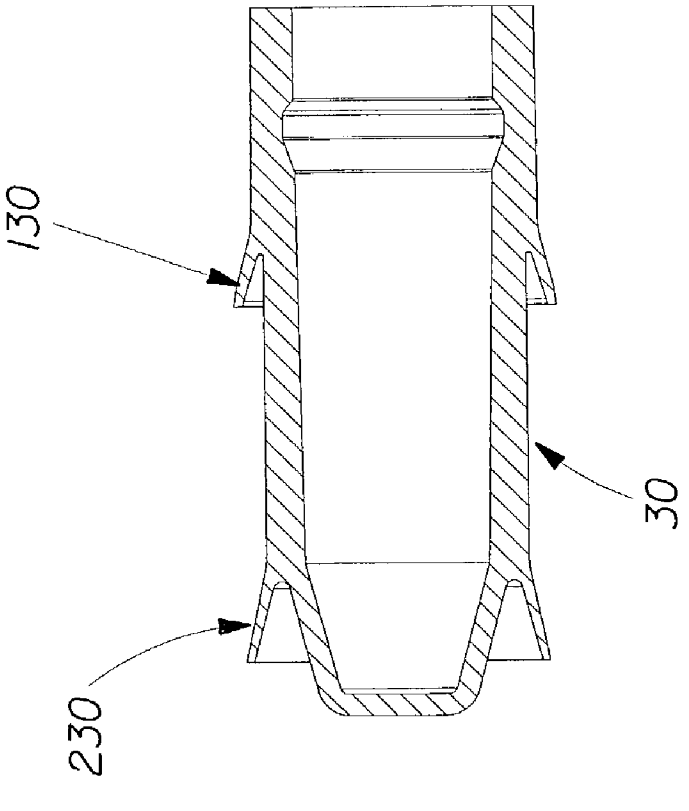
FIG. 6 is a cross-sectional side view along line 6—6 of FIG. 7 of the vent piston of the liquid sprayer of FIG. 2.

In accordance with one aspect of the present invention, the venting mechanism will now be described in greater detail with reference to FIG. 4 through FIG. 11. The venting mechanism includes a vent housing 32 and a translating piston 30. The vent housing is preferably a hollow cylinder closed at one end and having two openings 132 and 232 located on the cylinder's wall. Preferably, the two openings are spaced apart along the axis A—A of the vent housing as shown in FIG. 4. The other end of the vent housing is left open to enable the translating piston 30 to enter the vent housing. As shown in FIG. 6, the translating piston 30 is substantially a cylinder whose diameter is smaller than the inner diameter of the vent housing so that it can slide within the vent housing 32. When used in accordance with this invention, one extremity of the translating piston is closed and the other extremity is in contact with the trigger 34 so that motion of the trigger will translate the piston within the vent housing. The translating piston also comprises a first and a second deformable component having a portion that has a surface in contact with the inner surface of the vent housing and is capable of being deformed to leave a gap. The first deformable component is located on the translating piston so that when the piston is in a first position as shown in FIG. 8, and a second position as shown in FIG. 9, air cannot flow between the second opening 232 and the open end of the vent housing 32. The second deformable component is located on the translating piston 30 so that when the piston is in a first position as shown in FIG. 8, air cannot flow between the first and second opening, 132 and 232, and when the piston is in a second position as shown in FIG. 9, air can flow between the first opening 132 and the second opening 232 of the vent housing 32. In one embodiment of the invention, those deformable components are a first and a second chevron shaped member (herein after "chevron member" for simplicity) 130 and 230, located on the outer surface of the translating piston. As defined with regard to this invention, a chevron member is preferably a flexible ring with one edge connected to the outer surface of the translating piston. The chevron member has a V shape when view from the side. Those chevron members can also be formed onto the surface of the piston when the piston is molded. The largest diameter of those chevron members is longer than the inner diameter of the vent housing so that the other edge of the chevron members is substantially in contact with the inner surface of the vent housing when the translating piston slides in it. As a result, air cannot flow through those chevron members and thus provide a sealing effect. In one embodiment of the invention, the vent housing includes means for deforming the second chevron member 230, and located on the inner surface of the vent housing between the first and the second opening. When the trigger 34 is activated, the translating piston leaves its first position and moves towards the deforming means. When the second chevron member 230 encounters the deforming means, it is deformed and leaves a gap and thus the piston reaches the second position. Because of the gap created by the deformation of the chevron member, air can flow between the first and the second opening of the vent housing to enable venting. This deforming means is so that it will keep the second chevron member deformed at least until the trigger 34 closes the switch 40. Such deforming means can be for instance at least one element projecting from the inner surface of the vent housing. Such element can be in the form of a fin or a rib 332 located in the inner surface of the vent housing between the first and the second opening of the vent housing but other elements may be used to provide the same effect. The element can be either fixed or directly molded on the inner surface of the vent housing. Preferably, The inner surface of the vent housing has four of those elements as show in FIG. 4. In another embodiment of the invention, the venting mechanism also includes a compression spring located in the vent housing and biasing the translating piston so that when the user releases the trigger, the translating piston comes back to its first position. In one embodiment of the invention, the compression spring is kept centered in the vent housing by fins 432 extending from the closed end of the vent housing towards its opened end.

In another embodiment of the invention, the portable voltage source 42 is composed of rechargeable batteries connected by electric wires to a printed circuit board 84 comprising a battery charger jack 86 extending through the sprayer housing. Once the batteries are discharged, the user can connect the charger jack to a charger and thus recharge the batteries.

The foregoing description of the preferred embodiments of the invention have been presented for purposes of illustration and description. It is not intended to be exhaustive or to limit the invention to the precise form disclosed. Modifications or variations are possible and contemplated in light of the above teachings by those skilled in the art, and the embodiments discussed were chosen and described in order to best illustrate the principles of the invention and its practical application. It is intended that the scope of the invention be defined by the claims appended hereto.

What is claimed is:

1. A venting mechanism comprising:

a vent housing having an inner surface and an outer surface, a first opening and a second opening and a slideable piston disposed in said vent housing wherein said slideable piston comprises a first substantially annular chevron member so that an edge of said first substantially annular chevron member is in contact with said inner surface of said vent housing such that the inner portion of the vent housing is divided into a first part and a second part and wherein air cannot flow from one part to the other; and a second substantially annular chevron member so that an edge of said second substantially annular chevron member is in contact with said inner surface of said vent housing and so that a first position of said slideable piston in said vent housing prevents air from flowing between said first opening and said second opening of the vent housing and a second position of said slideable piston in said vent housing enables air to flow between said first opening to said second opening of the vent housing;

wherein said vent housing comprises means for deforming said second substantially annular chevron member and located on said inner surface on the vent housing between said first and second opening.

2. A venting mechanism according to claim 1 wherein said means for deforming said second substantially annular chevron member is at least one element projecting from said inner surface of the vent housing so that translation of said slideable piston towards said projecting element causes said second substantially annular chevron member to at least partially deform arid leave a gap that allows air to flow from said first opening to said second opening of the vent housing.

3. A venting mechanism according to claim 2 wherein said projecting element is a fin.

4. A venting mechanism according to claim 3 wherein said vent housing comprises four fins.

5. A venting mechanism according to claim 2 wherein said vent housing further comprises a compression spring so that said slideable piston is subjected to the biasing action of said compression spring.

6. A venting mechanism according to claim 1 wherein said vent housing further comprises a compression spring so that said slideable piston is subjected to the biasing action of said compression spring in said bottle contains a liquid.

* * * * *